May 23, 1950     A. LATOUR ET AL     2,508,954

ELECTRIC DISCHARGE DEVICE WITH AUXILIARY ELECTRODE

Filed Oct. 10, 1947     4 Sheets-Sheet 1

Inventors:
André Latour and
Roger Chambrillon

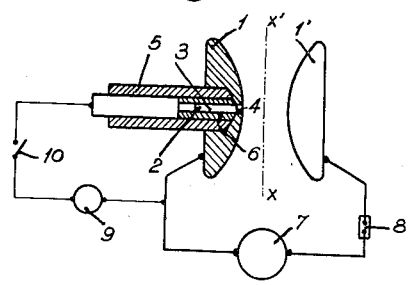
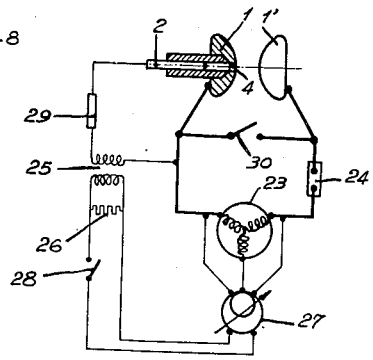
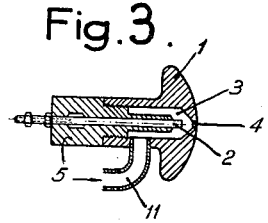
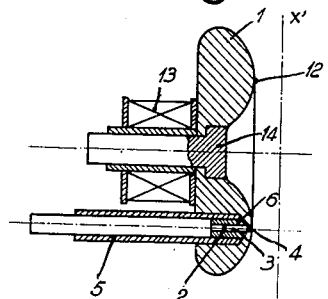
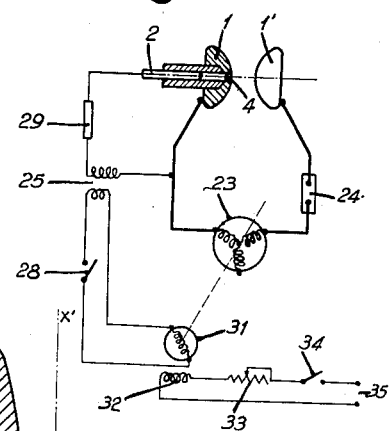
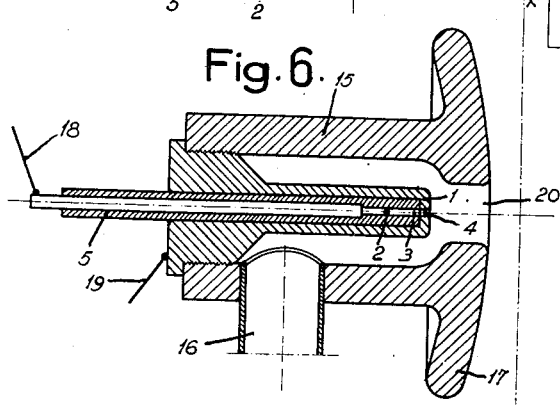

Patented May 23, 1950

2,508,954

UNITED STATES PATENT OFFICE 2,508,954

ELECTRIC DISCHARGE DEVICE WITH
AUXILIARY ELECTRODE

André Latour and Roger Chambrillon, Grenoble,
France, assignors to Etablissements Merlin &
Gerin, Grenoble, France Application October 10, 1947, Serial No. 778,992
In France February 3, 1943

Section 1, Public Law 690, August 8, 1946
Patent expires February 3, 1963

6 Claims. (Cl. 315—111)

It is often necessary in certain industrial plants, as those f. i. which comprise transformer, rectifier, converter or breaker circuits, as well as in testing circuits for breakers to obtain the closure of a given circuit independently of any mechanical movement. An easy method consists in the use of spark gaps so adjusted that their breakdown occurs at a tension superior to the tension applied. If by any artifice, this breakdown voltage is reduced to a lower value than that of the voltage applied, an arc strikes immediately between the electrodes of the spark gap and the circuit is closed. It has already been proposed to use as artifice an auxiliary arc starting from one or more electrodes called igniters, either between said electrodes, or between one of them and one of the main electrodes of a spark gap, the conducting gas or vapours produced by the auxiliary arc being conveniently directed between the main electrodes of the spark gap, f. i. by means of a suitable current of gas.

Such an arrangement presents different inconveniences due to the reciprocal actions exerted between the different discharge paths and which limit the latitude to regulate in an independent manner the effects of the auxiliary arc (effect of field distortion, ionising, calorific effects and so on) which must be used to influence upon the establishment or the functioning of the main discharge.

So the electric field existing between the main electrodes is considerably disturbed by the presence of one or more auxiliary electrodes whereby often insurmountable difficulties for a proper regulation are created. On the other hand, the kindling of the main arc necessitates a fairly strong auxiliary arc, consequently an auxiliary source of such a power that price and output of the plant are strongly affected. Finally as the auxiliary electrode is not protected, it risks to be rapidly destroyed by the main arc, the ionized vapours of which exert, in addition, on the auxiliary electrode pertubatory effects which become particularly disturbing in the case of repeated flash-overs.

The object of the present invention is to realise a device which by nature and disposition of the auxiliary electrode is free of the drawbacks referred to and which nevertheless permits in a particularly active and rapid manner the transmission of the effects created by the passage of the auxiliary arc to the main discharge path.

According to the invention the results are obtained by locating the auxiliary electrode in a chamber provided with an orifice placed in a manner that every blast of ionized gas coming out of this orifice creates an electric path between the main electrodes. According to the present invention the orifice may be provided so as to open tight on the surface of the main electrode. In this case, the walls surrounding the orifice form an electrode with respect to the auxiliary electrode. The said orifice may open at the nearest point to the main electrode opposite to the main electrode bearing the auxiliary electrode and thus be located right at the place where the main arc strikes. It may, however, be located at some distance of this place if it is to be preserved of the action of the main arc. With exception of the orifice forming electrode, the chamber may be entirely closed. It may, however have a second orifice through which compressed gas may be introduced which will then flow out the orifice—electrode. The walls of the chamber may be entirely metallic and the auxiliary electrode may then be insulated by means of an insulating sleeve. The walls of the chamber may also be of insulating material eventually of insulating material producing gases under the action of the arc. These same conductive or insulating walls may contain ionising substances destined to make more conductive the gases produced by the arc. The active end of the auxiliary electrode may advantageously consist of refractory metal, for instance, of tungsten with eventually, addition of a substance easily releasing its electrons, as, f. i. Thorium.

The device, according to the invention, has many applications, particularly in all cases where an electric circuit is to be closed, either definitely, or temporarily or periodically, means being, eventually, provided to ensure the extinction of the arc kindled between the main electrodes.

In the case of spark gaps the invention is equally applicable to symmetrical spark gaps (spherical or thoric spark gaps) to dissymetric spark gaps (f. i. plate and rod gaps), to spark gaps with blow-out ensuring the dielectric regeneration between main electrodes, to spark gaps without blow-out device, to spark gaps comprising a single main electrode provided with an auxiliary kindling electrode, and to spark gaps in which both main electrodes are provided each with an auxiliary kindling electrode.

The accompanying drawings show only by way of example and in no limitative manner, several designs of spark gaps according to the inventions as well as some applications of such spark gaps, one of the electrodes being shown in a cross-section passing through the axis.

Figs. 1 to 8 represent different forms of construction of spark gaps according to the invention, one of the electrodes being shown in a cross-section in a plane through its axis.

Figs. 9 to 15 represent various applications of the spark gaps hereabove.

Fig. 1 shows a design of a spark gap according to the present invention in which the conducting path formed by the ionized gases is blown off by a blast of compressed isolating gas, f. i. compressed air.

Figure 1:
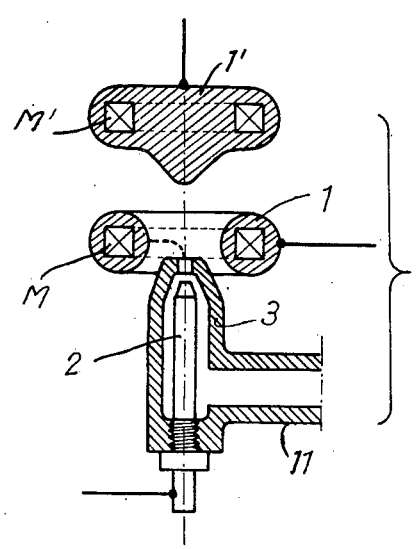

In this Figure 1, 1' is the main spark gap and 2 the auxiliary electrode. 1 and 1' have a respectively toric form or a form approaching the toric form and the form of a top. The arc kindling electrode 2 is located in the interior of a blast pipe of insulating material, to which compressed air is supplied by the pipe 11. The device works as follows:

The distance between the electrodes 1 and 1' is so calculated that in absence of any ionising effect, no possibility for a flashover is given. But as soon as a sufficient potential difference arises between 1 and 2 an arc strikes between these two electrodes on the path marked by a dotted line. The hot gases, however, produced by the action of the compressed air on the arc, form a straightlined jet of strongly ionised gases, which attain almost instantaneously the extreme point of the electrode 1'. A conducting path is thus established between the electrodes 1 and 1' giving rise to an arc between these electrodes. If this arc is to be allowed to subsist during a notable time without deteriorating the surface of the electrodes 1 and 1', it must be obliged to move rapidly, which is easily obtained, f. i. by a magnetic field with radial fieldlines created by two opposite coils M and M' preferably located at the interior of said electrodes.

Figure 2:
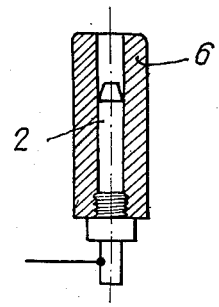

Instead of using compressed air, use may be made for the blast of the electrode 2 of the property presented by numerous chemical materials to produce under the influence of the arc various gaseous emanations. Under such conditions, the auxiliary electrode 2 is simply located at the interior of a tube 6 made of convenient gas-producing material, as shown in Fig. 2.

Fig. 3 shows a variation of design in which the auxiliary electrode is located at the interior of the main electrode 1: for this purpose the electrode 1 is provided with an internal chamber 3 opening through the orifice 4. The auxiliary electrode 2 is so located in this chamber that its extremity lays near the orifice 4. The auxiliary electrode is isolated from the main electrode 1 by a sleeve 5. Compressed gas may be introduced into the cavity 3 by a duct 11. The flow of this gas through the orifice 4 does not cause an arc between the main electrodes, but as soon as an arc strikes between 2 and 4 the compressed gas is ionized, a conductive path is created and the arc strikes between the main electrodes. Although in the present case the walls of the cavity 3 are metallic, there is no obstacle to combine this device with that in Fig. 2, in which the walls are of a gas-producing material.

Fig. 4 is an example of an embodiment of the invention as it has been described hereabove.

In this figure, the main electrodes 1 and 1' have a hemispheric form and are so opposite to each other, that their surface is symmetric with respect to the axis X—$X_1$. According to the invention the main electrode 1 is provided with an auxiliary kindling electrode 2 located in the chamber 3, opening on the surface of the main electrode through the orifice 4. The walls of the chamber are formed by the tube 5, which in the same time serves as support and as insulator for the auxiliary electrode. Eventually the tube 5 may contain a sleeve 6 of a material other than the material the tube 5 is made of. It may be advantageous to choose as material for the sleeve 6 one which produces gases under the action of the spark or the electric arc. This material may eventually be modified in order to have it produce more or less conductive gases, by incorporation of suitable metallic oxides.

In order to secure a better understanding of how the device functions according to the invention, Fig. 4 shows a particular application in which the spark gap is supposed to act as closing relay. In this diagram 7, is a source of direct or alternating current, 8 is any kind of receiver, which is intended to be switched at a given moment into the circuit of the source by intermediary of the spark gap 1 and 1'. 9 is an auxiliary source of convenient tension. Form of and distance between the electrodes is so chosen that, in absence of any notable ionisation agent, the tension applied to the electrodes is insufficient as to cause a discharge. If, at a given moment the main circuit 1'—8—7—1— is to be closed, it suffises to close by the switch 10 the auxiliary 4—9—10—2— wherein, in fact the extremity of the auxiliary electrode 2 and the walls of the orifice 4 form the poles of an auxiliary gap. When the switch 10 is closed, a flashover occurs between 4 and 2 whereby the temperature of the gases in the chamber 3 is considerably raised causing the expansion of the gases which flow in form of an ionised and conductive jet through the orifice 4 and give rapidly rise to a discharge between the electrodes 1 and 1'. This effect may still be increased by making the walls of the chamber 3 of a material, which under the action of the auxiliary arc produces gases, or by making the electrode 2 or the orifice 4 of a relatively volatile metal. As mentioned above the conductivity of the gases streaming out through the orifice, 4 may be increased at will by adding to the materials, the electrode 2, the walls of the orifice 4 or of the chamber 3 are made of convenient metallic salts or metallic oxides (alkaline, earthy alkaline or radio active metals).

As the speed of the conductive gases spirting from the orifice 4 is finite a certain time lag exists between the discharge of the auxiliary spark gap 2—4 and the discharge of the main spark gap 1—1'. It may be in certain cases advantageous, in order to reduce this time lag, to provide the electrode 1' too, with an auxiliary gap, so that the whole set is symmetrical to the axis X—$X_1$. In this case, the two jets of kindling gases meet halfway whereby the time lag for the main discharge is considerably reduced. It is understood that this form of realisation is applicable to all examples given hereafter:

The switch 10 is by no means indispensable. In fact, the source 9 may be provided such as to produce one or more tension impulses producing the auxiliary discharge between 2 and 4. In a general way, the source may be constituted by any known source producing a tension (battery, accumulator, dynamo, rectifier, alternator, transformer, condenser, resistance or impedance through which passes a current and so on).

The regulation of the flash over tension of the auxiliary spark gap 2—4 may be obtained by displacing the kindling electrode 2 with respect to the orifice 4. Or, by inserting into the auxiliary circuit a regulator gap, eventually provided with a blow out device. If the potential of the electrodes is to be fixed with respect to each other, they may be connected by a convenient resistance, inductance or impedance.

When the discharge between 2 and 4 has begun and has served its purpose, it is desirable to extinguish it as quickly as possible. If the tension provided by the source 9 is an alternating one, the extinguishing effect of the gases leaving the chamber 3 is generally sufficient, this effect may be, moreover, increased by inserting into the auxiliary circuit a resistance, the ohmic value of which decreases rapidly with the applied tension or a spark gap with blow out or any other interrupting device, eventually in combination with the switch 10.

All preceding considerations are valid for the example following hereafter, which are given merely for a better understanding of the spirit of the invention and which by no means are limitative.

If the main discharge assumes the form of an arc of high power and notable duration, it may become useful to displace rapidly the root of the arc on the surface of the main electrode by means of a convenient blow out, f. i. a magnetic blow-out.

It is advantageous to give the main electrode the form of an appropriate revolution body, f. i. the form of a torus.

Fig. 5 shows a device of that kind. 1 represents the main electrode supposed to cooperate with a similar electrode symmetrically placed with respect to the axis X—X₁. Using the same references as before 2 is the auxiliary kindling electrode, 3 the compression chamber, 4 the orifice-electrode, 5 the insulating tube etc... The circular displacement of the main arc, spirting on the part of the surface 12 which is nearest to the symmetrical main electrode, is secured by a magnetic field with the lines of force of which are as much as possible perpendicular to the axis of the arc.

This field may be created by means of a winding 13 coaxially placed on the rear face of the electrode 1. A single main electrode may be provided with such a winding, however, each electrode may have its own winding, but in this case the extremities of the windings which are opposite each other must have the same magnetic polarity. These windings may be excited by an independent source of supply, or may be connected only in series with the main electrodes and this way excited by the current which flows in the main arc. A strengthening and a better distribution of the magnetic field is obtained by providing a magnetic core with a more or less extending extremity 14.

If the utilised magnetic field is alternating, it is advantageous to split radially the main electrode provided with a winding. It is not essential to place the auxiliary gap 2—4 at the place indicated in Fig. 5, it may be placed outside the path of the main arc f. i. in the core 14 along the axis of the main electrodes. The increase in ignition lag resulting by so doing need not be an inconvenience.

Figure 7:
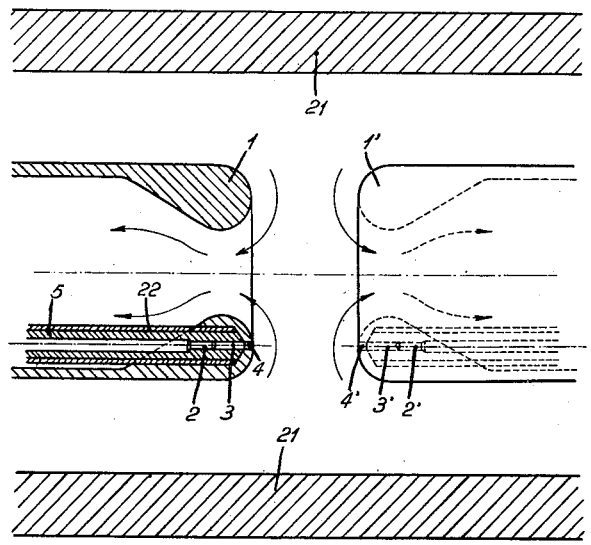
Figure 8:
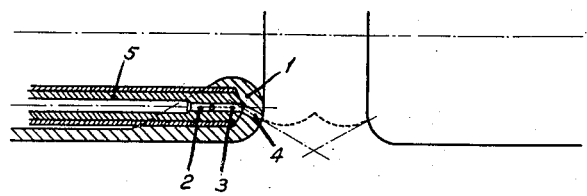

In certain applications, it is necessary to reestablish very rapidly, after extinction of the main arc, the dielectric strength of the gap separating the main electrodes. This may advantageously be achieved by a current of compressed air enveloping, completely or partially, the active surface of the main electrode. Figs. 6—7—8 show some examples of embodiments of this modification of the invention.

In Fig. 6, and with the same references as previously used, 1 is the main electrode, 2 the auxiliary kindling electrode, 3 the compression chamber, 4 the orifice electrode, 5 the insulating tube. The main electrode 1 is located in the interior of a blast nozzle 15, so arranged as to be supplied with compressed gas or air by means of one or more ducts 16. The body of the blast nozzle may eventually bear an extension 17 destined to improve the distribution of the electric field. The whole device may be totally or partially symmetrically arranged with respect to the axis X—X₁. 18 and 19 are the terminals of the auxiliary spark gap, while the terminal 19 is equally the terminal of the main electrode 1. The air blast gushing throughout the tip 20 of the nozzle does not disturb the kindling of the main arc by the conductive gas jet spirting from the orifice 4. But this air blast prevents, as soon as the main arc has been extinguished any restriking of the arc, which might occur by exterior influences, and without intervention of the auxiliary spark gap, which, of course, is supposed to blow out as soon as its function as igniter has been accomplished.

Fig. 7 shows another embodiment of the invention, comprising means for dielectric regeneration of the gap between the main electrodes, which in the present case are tubes with a toric shape of their extremities 1 and 1'. They are located in the interior of an enclosure, in which, by means not shown, a pressure of compressed gas or air is maintained. The interior of the tubes 1—1' communicates with the atmosphere, this secures a gaseous flow in the direction indicated by the arrows thanks to which the gaseous medium situated between the electrodes 1—1' is constantly and rapidly renewed. As in the previous example, the main electrode 1 is provided with an auxiliary kindling electrode 2 with its compression chamber 3 and its orifice electrode 4. The insulating tube 5 may eventually be sheathed by a metallic tube 22, destined to protect the tube 5 against the action of the hot gases circulating at the interior of the main electrode 1. The main electrode 1' may be provided too, with an auxiliary kindling electrode 2' preferably placed opposite the auxiliary electrode 2 and coaxially with it.

In a device according to Fig. 7, the conductive gases streaming out through the orifice 4 might be disturbed in their kindling function by the deviation imposed upon them by the gaseous blast provided for the dielectric regeneration of the gap 1—1'. This inconvenience may be overcome by providing the orifice 4 such as to have an inclined axis with respect to the axis of the electrode. This inclination cancels, partially or totally, the effect of the deviation imposed on the conductive jet by the gas blast. The conductive jets now follow a path shown in dotted lines in Fig. 8 and meet easily.

According to the invention all spark-gaps may be provided, if necessary, with a convenient cooling, f. i. a water circulation, applied as well to the main electrodes as to the auxiliary kindling electrodes in order to secure an operation of long duration.

The following figures show various examples of application of spark-gaps herebefore described. For convenience of drawing, they are represented in a simplified form, but it is understood that each application necessitates the most appropriate type of the spark gap in order to attain the desired result, so that a careful choice has to be made among the types described hereabove.

Fig. 9 shows a spark gap 1—1' according to the invention used as closing switch and playing the part of a synchronised relay, capable to close the circuit at a predetermined point of the curve of the alternating tension furnished by the generator 23 supposed to supply some kind of receiver 24. In order to attain this object, the kindling electrode of 1 is connected f. i. to the secondary winding of a transformer, the tension of which may be at will dephased by some angle with respect to the tension of the generator 23 by an appropriated means, f. i. an induction regulator 27. In order to close the main circuit 23, 1—1'—24 at a given pre-fixed point of the curve of the electro-motive tension of the generator, it suffises to regulate previously the induction regulator and then to close the switch 28. Supposing that the crest value of the secondary voltage of the transformer 25 is barely higher than the flash-over voltage of the auxiliary spark-gap 2—4, it will be realised that the arc on the auxiliary spark-gap will occur at the first instant following the closure of 26, in which the secondary tension of 25 passes through its maximum. In order to prevent the surge, caused by the closing of 26, to flash-over prematurely the spark-gap 2—4 the primary winding 25 of the transformer is shunted by a non-inductive resistance 26. The intensity of the kindling discharge may be regulated by any suitable impedance 29 inserted into the circuit.

It will be realized that the duration of the auxiliary arc, produced by the crest value of the tension, should normally not be longer than a quarter of a cycle, the gases streaming through the orifice 4 having to ensure its extinction or rather to prevent its restriking and its degeneration into a permanent arc. If however this action is insufficient, an appropriate device may be inserted into the circuit, as explained heretofore (a blow out spark gap, resistance with a resistivity varying according to the tension, automatic circuit-breaker). In order to increase the precision of the kindling, it is advantageous to use a tension curve as pointed as possible and differing from the normal sinusoidal curve. Such a curve may be obtained by any of the numerous and well known means, particularly by a resistance connected in series with a transformer or an inductance with saturated magnetic core. If the main arc burning between the electrodes 1—1' is to last a notable time and with a high energy it is advantageous, in order to prevent an exagerated wear of the electrodes, to use some device, ensuring the displacement of the roots of the arc at their surface. Such a device is shown f. i. (in Fig. 3).

The spark gap 1—1' may be also short-circuited by a switch 30 which closes immediately after the flash-over of the spark-gap. This closure may be commanded f. i. automatically.

A result similar to that obtained by the diagram shown in Fig. 9 may be obtained as shown in Figure 10, by an alternator, the armature of which feeds the primary of the transformer 25. If the generator 23 is a rotary machine, the alternator 31 may be mechanically coupled to it. If, however, the generator has a static character (f. i. the secondary of a static transformer), the coupling of the alternator may be realised electrically by a synchronous motor. In both cases, the regulation of the de-phasing of both voltages is achieved by mechanical angular shifting of the stationary part of the transformer. The kindling of the main arc is achieved in the same manner as described for Fig. 7, by closing the switch 26. It may however be also obtained by closing the switch 34 which controls the excitation circuit of the alternator 31.

Figure 11:
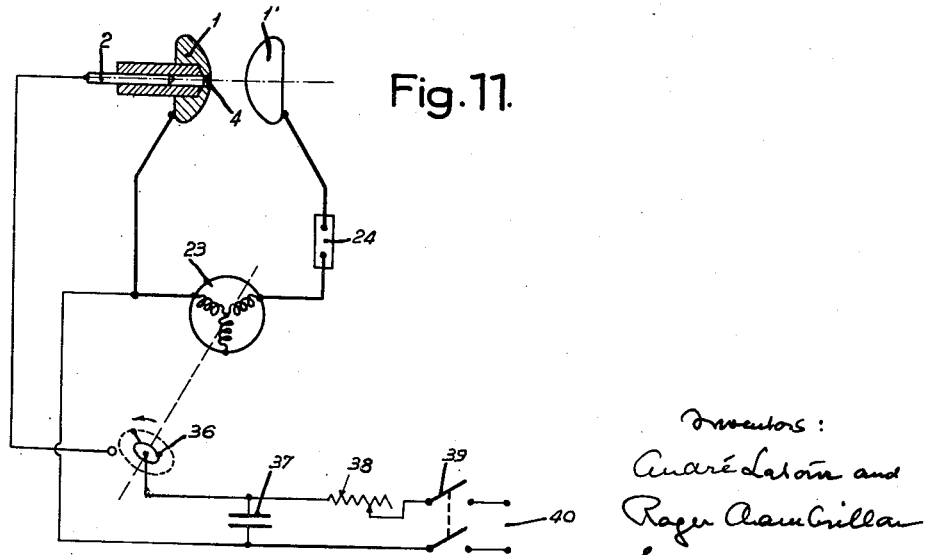

Finally, as shown in Fig. 11, the alternator 31 may be replaced by a rotary spark-gap 36 transmitting at the right moment to the kindling spark gap 2—4 the energy previously stored up in a condenser 37, charged by a convenient source 40 through the resistance 38 and controlled by a switch 39. The closure of the switch determinates with a time lag corresponding to the sufficient charging of the condenser, the closing of the main circuit by flash-over of the spark-gap 1—1'.

The examples shown in Figs. 9 — 10 — and 11 have considered hitherto only the case of a definitive and permanent flash-over of the main spark-gap 1—1'. If this spark gap is however provided with a device, securing the dielectric regeneration of the gap between the electrodes, as it is the case with the device shown in Figs. 6 and 7, then arises the possibility of periodical extinction and restriking of the arc, a possibility liable to industrial applications as f. i. of current rectification.

The arrangement in Fig. 11, f. i. is very well suitable to work as a one phase rectifier, as the kindling electrode can only operate one time per cycle, a rectification is only possible by polarising the auxiliary circuit either by inserting a continuous electro-motive force, either by eliminating one of the alternations by a rectifier. A polyphase rectification is obtained in the usual way by using as many sprak-gaps as there are phases to be rectified and it is understood that all devices and connecting methods used with thermo-ionic rectifiers, are applicable, here too, particularly the multiple balance inductances and neutral points.

Figure 12:
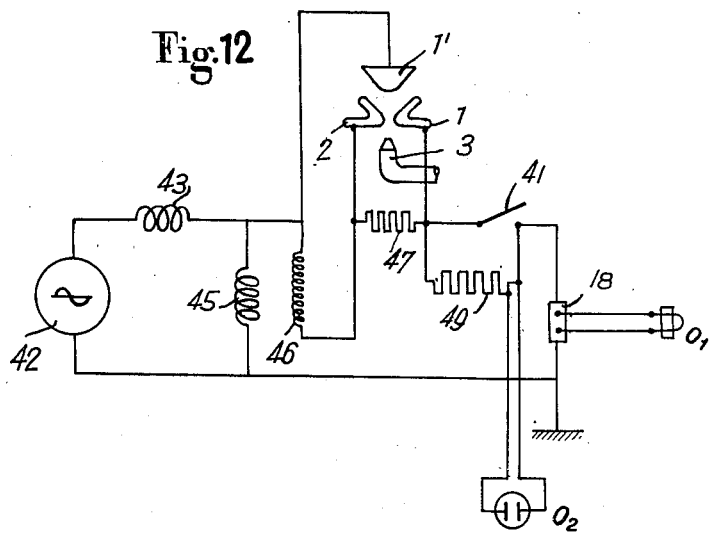
Figure 13:
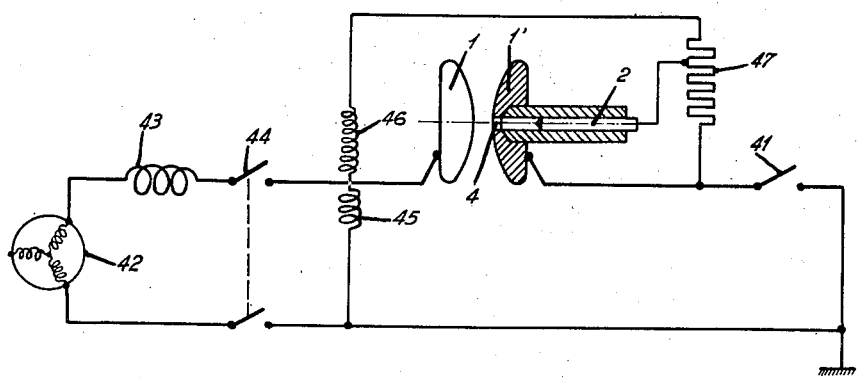
Figure 14:
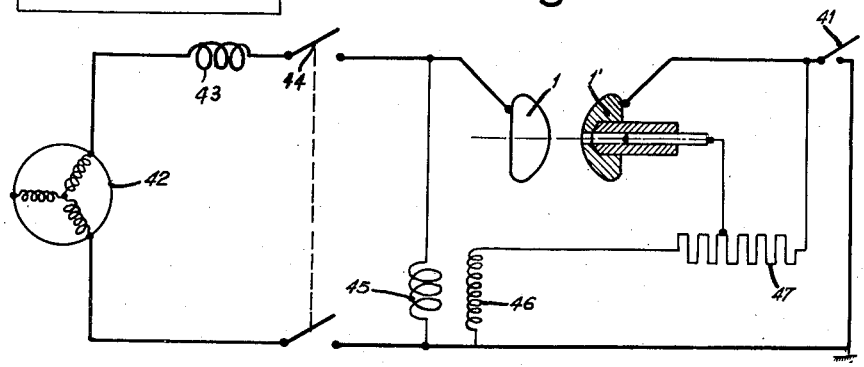

The spark-gaps according to the invention are equally suitable to be used for the realisation of schemes for indirect tests of circuit-breakers as shown in Figs. 12—13—14—and 15.

In Fig. 12, 41 is the circuit-breaker to be tested, 42 a generator with a comparatively low tension, and high current intensity (alternator or transformer secondary) the output of which may be adjusted by means of an inductance or impedance 43. The spark gap 1—1' is connected in series with the circuit-breaker 41, the pole of which nonconnected to the spark-gap may eventually be grounded. The generator 42 feeds on the other hand, the primary 45 of a step-up transformer, the secondary 46 of which is connected through a resistance 47 to the connection between the circuit-breaker and the spark-gap. The gap between the electrodes 1—1' is established so that when the auxiliary gap is out of action, the flash-over voltage is superior to the tension of the secondary 46. Supposing that a closing test has to be made, the arrangement works as follows:

The circuit-breaker is open and subject to the sum of the tensions of the generator 42 and of the winding 46, said sum of voltages being precisely the test voltage. On the other hand the tension between the electrodes is zero because no current flows yet in the resistance 47. No discharge can occur therefore between the electrodes 1 and 1'.

If now, the circuit-breaker is closed an arc will strike between its contacts as soon as the latter are separated by a distance corresponding to the flash-over distance of the test voltage. The current flowing in this arc flows also through the resistance 47 and creates at its terminals a difference of potential which appears in the same time between the electrodes 2 and 1 and strikes an arc on the electrode 2. The compressed air-blast passing through the blast nozzle 3 blows the arc between 2 and 1 in such a direction that the latter starts the discharge of the main spark-gap 1—1'. From this moment on the generator feeds directly the circuit-breaker 41, and if the time lag between the initial discharge and the arc of the main spark-gap is negligible, it may be said that things have occurred as if the circuit-breaker had been subjected to the action of a source supplying the same current as the generator 42 under a tension equal to the sum of tensions of the generator 42 and of the step-up winding 46.

To the test circuit described hereabove may be added recording devices like a tension divider 49 and the shunt 48. An oscillograph O₁ is then connected to the shunt 48 and another oscillograph, f. i. a cathodic oscillograph, O₂ to the tension divider 49.

It will be realised that at the instant when the main discharge occurs in the spark-gap 1—1' the tension at the terminals of the primary 45 drops considerably, due to the fact of the increase of current in the generator 42 and in the inductance 43. It is the same for the secondary 46. This drop of tension creates favorable conditions permitting to the devices provided for the extinction of the auxiliary arc between 2 and 1 to operate with full efficiency. Should, however, this device not be sufficient, then the acceleration of the extinction of the auxiliary arc may be secured by inserting into the connection between the electrode 2 and the resistance 47 a source supplying an alternating tension of suitable magnitude and phase.

Fig. 13 shows a variation of the same diagram, in which a switch or circuit-breaker is added, permitting to switch in or off the whole testing device. The spark-gap with pneumatic blow-out has been replaced by a spark-gap with auto-generation of gas, similar to the spark-gap shown in Figs. 2 and 4. It is understood that in applications described hereabove or hereafter, either the one or the other form a spark-gap with controlled kindling of the arc may be used, according to the individual case, without departing from the general spirit of the present invention.

The spark-gap as shown above suits perfectly for closure tests. If the spark-gap is to be used for opening tests, it becomes necessary to provide the spark-gap 1—1' with a device securing a rapid dielectric regeneration of its gap. For this purpose devices, as described by the Figs. 6 to 8, may advantageously be used. The whole arrangement works then as follows:

The circuit-breaker 41 at the beginning is closed, consequently a current flows, as soon as the switch 44 is closed, through the resistance 47, producing a discharge in the spark gap 1—1'. Whereupon the generation supplies its full current to the circuit breaker 41. As long as the latter remains closed or as long as its contacts remain too near to each other, to permit the breaker to attain a sufficient breaking capacity, the main arc between 1—1' restrikes after each extinction in spite of the device for dielectric regeneration. This happens because the circuit-breaker cannot stand yet the tension of the step-up winding 46 and permits the flow of a fault current which flows also through the resistance 47 and produces at its terminal the difference of potential which causes the electrode 2 to kindle the arc every time that the recovery tension reappears at the terminals of the breaker 41. If at a given moment the dielectric strength between the contacts of the breaker 41 has become sufficiently strong, as to stand the recovery tension whereby it is taken as granted that all measures have been taken by design to secure that the main electrodes 1—1' of the spark gap will stand this tension too, no current flows through the resistance 47, the difference of potential between the electrodes 2—4 is zero, and the main spark gap 1—1' cannot flash-over. The circuit-breaker 41 will thus have interrupted the full current supplied by the generator 42 under a tension which according to the ratio of the step-up transformer 45, 46 might be several times higher than the own tension of the generator 42.

If the isolating switch is to be closed, an appreciable time before the circuit-breaker 41 is able to operate a break, it might be useless or even harmful to have the main arc burning during this time between the electrodes 1—1'. This inconvenience may be avoided by making the electrodes 1—1' movable with respect to each other and by maintaining them in contact as long as the circuit-breaker is not able to operate a break. Such an arrangement may be realised in an advantageous manner by mounting one of the two electrodes 1—1' or both integral with a piston, which is pushed by a spring in a direction such that the two electrodes are maintained pressed together, when no sufficient pressure exists within the casing by which they are surrounded. As soon as the de-ionising agent is blown into the casing the electrodes part, and are automatically set in correct position thus permitting the spark gap to recover very rapidly its normal properties.

Another solution is to leave the electrodes of the spark gap 1—1' stationary and to connect in parallel with the spark gap a circuit breaker of suitable breaking capacity which is opened only at the instant when the circuit-breaker 41 is able to operate. It is not indispensable to mount the transformer 45, 46 according to the Fig. 13. Another way to connect the transformer to the circuit is shown in Fig. 14, and consists in connecting the common point of the primary and secondary windings to the grounded section of the main circuit. This arrangement calls however, for the same tension at the terminals of the circuit-breaker 41 as previous, for a higher ratio of the step-up transformer and is therefore from this point of view less advantageous than the arrangement shown in Fig. 13.

Figure 15:
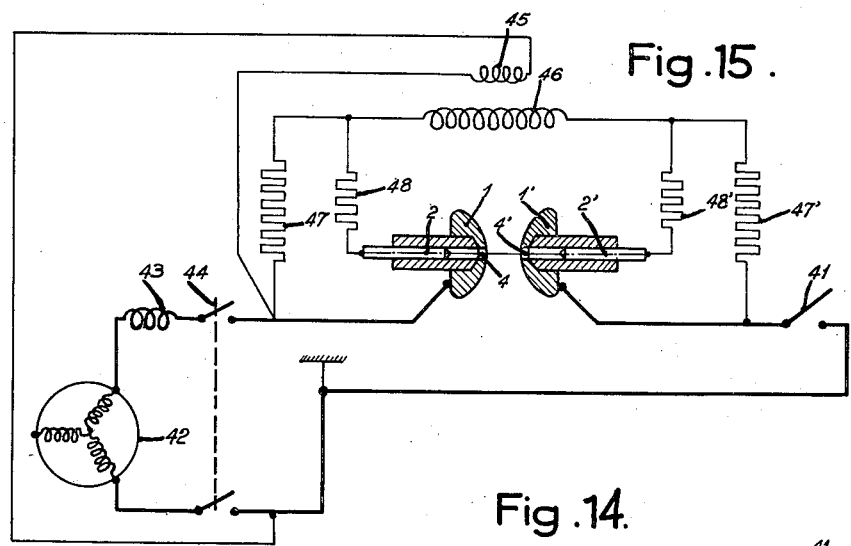

In certain cases, f. i. when the tension is so high that an important gap between the electrodes 1—1' becomes necessary and the time lag for the kindling of the main arc is to be reduced, there is advantage to use two kindling auxiliary electrodes 2 and 2' as shown in Fig. 15. In this case, it is not indispensable that the electrodes 2 and 2' kindle simultaneously, owing to the fact that they are subject to same tensions produced by resistances of equal value 47 and 47'. In the contrary these resistances may have different values and 47' f. i. have a high ohmic value. The kindling of the auxiliary spark gap 2—4 then will be a result of the increase of the auxiliary current produced by the initial kindling of the spark gap 2'—4'. Each kindling electrode may have in its own circuit, as explained above, its own regulating elements, such as resistances 48—48', impedances, spark gaps with or without blow out, supplementary alternating supply sources ensuring a correct kindling and extinction of the auxiliary arc.

Finally, whatever the considered application might be, in the case of very high tensions, according to the invention, several spark gaps may be connected in series, whereby the usual measures are to be taken to ensure a uniform repartition of the tension on the spark gaps. This may be achieved by connecting each spark-gap to a portion of the winding of the step-up transformer or by shunting each spark gap by an ohmic inductive or capacitive impedance of suitable value.

The invention must not be arbitrarily limited to the few examples of embodiments described hereabove. The invention covers all possible modifications of design according to the application.

What we claim is:

1. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap in said high current circuit, an impedance in said high voltage circuit, and an auxiliary discharge gap controlled by the voltage drop across said impedance and mounted in relationship with said first mentioned discharge gap promoting by breaking down the ionization of said first mentioned discharge gap.

2. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap on said high current circuit, an impedance on said high voltage circuit, an auxiliary discharge gap mounted in parallel to said impedance and in spatial relations with said first mentioned discharge gap the spatial relation of said discharge gaps being designed for said first mentioned discharge gap being ionized by the ionized gases issuing from said auxiliary discharge gap.

3. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap on said high current circuit, an impedance on said high voltage circuit, an auxiliary discharge gap mounted in parallel to said impedance and in spatial relations with said first mentioned discharge gap so as to promote said break-down of the auxiliary discharge gap as consequence of the ionization provoked by the break-down of said first mentioned discharge gap, the spatial relation of said discharge gaps being designed for said first mentioned discharge gap being ionized by the ionized gases issuing from said auxiliary discharge gap.

4. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap on said high current circuit, an impedance on said high voltage circuit, an auxiliary discharge gap mounted in parallel to said impedance and in spatial relations with said first mentioned discharge gap the spatial relations of said discharge gaps being designed for said first mentioned discharge gap being ionized by the ionization gases of said auxiliary discharge gap, a pressure gas source, and duct means for directing the pressure gas from said source to said discharge gap.

5. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap on said high current circuit, an impedance on said high voltage circuit, an auxiliary discharge gap mounted in parallel to said impedance and in spatial relations with said first mentioned discharge gap, a pressure gas source, and duct means for directing the pressure gas from said source to said discharge gaps, the spatial relation of said discharge gaps being designed for the arc of said first mentioned discharge gap being changed over to said auxiliary discharge gap in response to the blast action of the pressure gap.

6. In an arrangement for indirectly testing circuit breakers or the like, in combination the device to be tested, means connected to said device for supplying electric power at relatively high voltage, constituting the high voltage circuit, means connected to said device for supplying electric power at relatively high current, constituting the high current circuit, a discharge gap on said high current circuit, in impedance on said high voltage circuit, an auxiliary discharge gap mounted in parallel to said impedance and having an electrode a tube of gas producing substance having said electrode, the spatial relations of said discharge gaps being designed for the produced gas being directed towards said first mentioned discharge gap.

ANDRÉ LATOUR.
ROGER CHAMBRILLON.

REFERENCES CITED

The following references are of record in the file of this patent:

UNITED STATES PATENTS

| Number | Name | Date |
| --- | --- | --- |
| 1,551,970 | Schafer | Sept. 1, 1925 |
| 1,739,443 | Dunoyer | Dec. 10, 1929 |
| 1,843,645 | Von Issendorff | Feb. 2, 1932 |
| 1,873,963 | Jonas | Aug. 30, 1932 |
| 1,980,459 | White | Nov. 13, 1934 |
| 2,400,457 | Haine | May 14, 1946 |